United States Patent [19]
Yang

[11] Patent Number: 5,722,675
[45] Date of Patent: Mar. 3, 1998

[54] GYMNASTIC TOY CAR

[76] Inventor: Cheng-chung Yang, P.O. Box 1-252, Sanchung, Taiwan

[21] Appl. No.: 586,323

[22] Filed: Jan. 17, 1996

[51] Int. Cl.[6] ................................................ B62M 1/16
[52] U.S. Cl. ...................... 280/244; 280/242.1; 280/268
[58] Field of Search .......................... 280/242.1, 243, 280/244, 246, 247, 251, 253, 263, 264, 267, 269

[56] References Cited

U.S. PATENT DOCUMENTS

| 1,784,875 | 12/1930 | Jesswein | 280/268 |
| 2,402,880 | 6/1946 | Estes | 280/242.1 |
| 4,783,091 | 11/1988 | Chi | 280/242.1 |
| 4,787,647 | 11/1988 | Oh | 280/267 |
| 5,536,029 | 7/1996 | Gramckow | 280/263 |

Primary Examiner—Anne Marie Boehler
Attorney, Agent, or Firm—Jacobson, Price, Holman & Stern, PLLC

[57] ABSTRACT

A gymnastic toy car comprising a car body with a housing and a chassis, two front wheels on the front two sides of the chassis, two rear wheels on the rear two sides thereof through a rear axle, two rockers on two fixing frames on the front two sides of chassis, the upper ends of two rockers extending to the upper side of housing, a four-bar linkage between the two front wheels, two drive mechanisms on the rear axle, and a brake device on the chassis nearby one rear wheel on one side. Shaking the two rockers forward and rearward continuously and simultaneously or alternately actuates the two drive mechanisms to drive the two rear wheels moving forward. Shaking and tilting the two rockers left or right actuates both the two rear wheels moving ahead and the four-bar linkage turning the two front wheels left or right, and stopping the shaking of two rockers and stamping the pedal of brake device slows down or stops moving the two rear wheels.

2 Claims, 5 Drawing Sheets 5,722,675

GYMNASTIC TOY CAR

BACKGROUND OF THE INVENTION

Most conventional gymnastic toy cars are limited to be toys in general for children only but lacking in gymnastic function. Particularly such conventional gymnastic toy cars are not suitable for adults doing gymnastic activities. In view of the above, the present inventor developed a novel gymnastic toy car for both children and adults.

SUMMARY OF THE INVENTION

A gymnastic toy car comprises a car body, two front wheels, two rear wheels, two rockers, a four-bar linkage, two drive mechanisms and a brake device. A child or adult standing or sitting on the car body and continuously and simultaneously or alternately shaking the two rockers can actuate the two drive mechanisms driving the two rear wheels and moving the toy car forward, to tilt the two rockers right or left and to perform the foregoing shaking operation can turn the toy car right or left and move it forward, and to stop shaking the two rockers and to stamp the brake device can stop the toy car moving forward.

DETAILED DESCRIPTION

Figure 1:
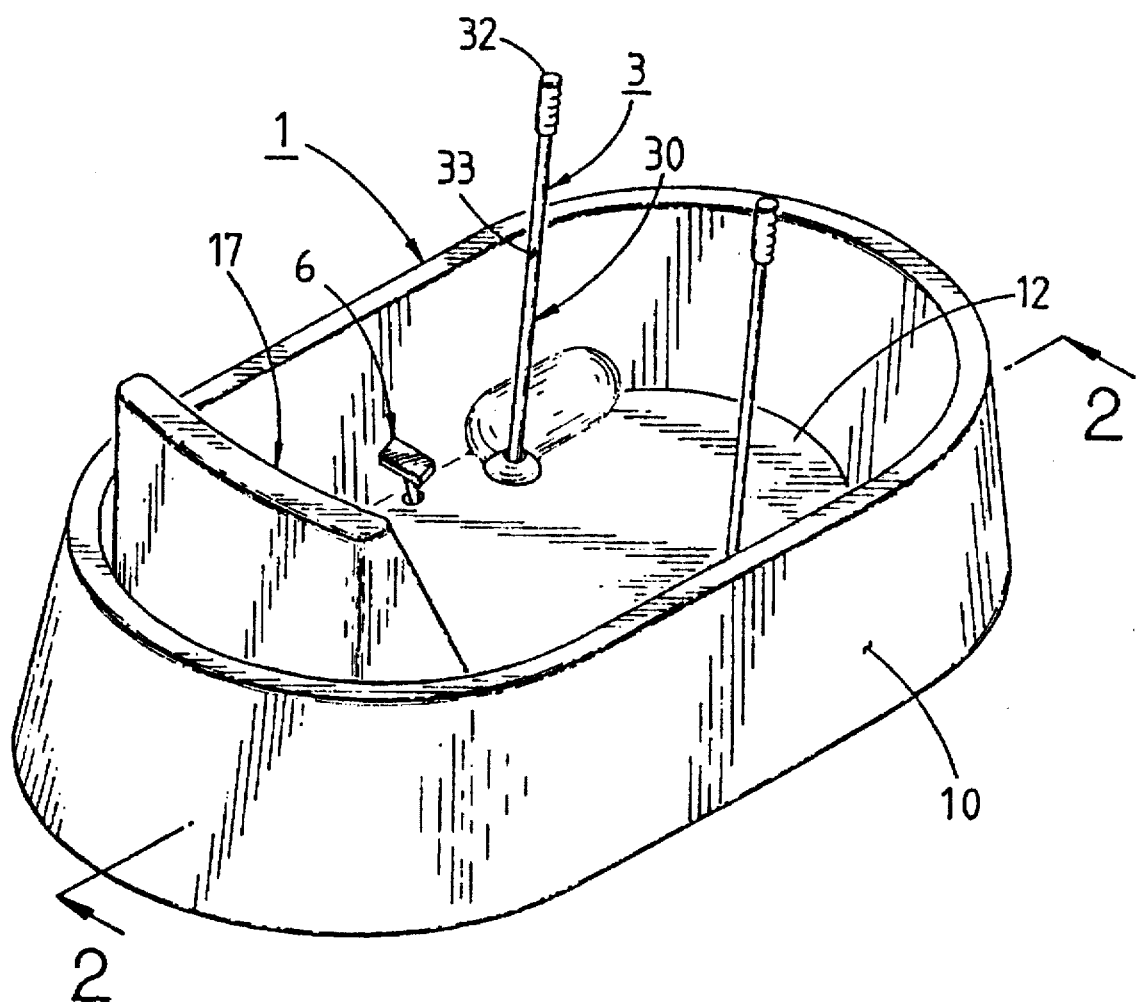
FIG. 1 is an elevational view of the present invention.
Figure 2:
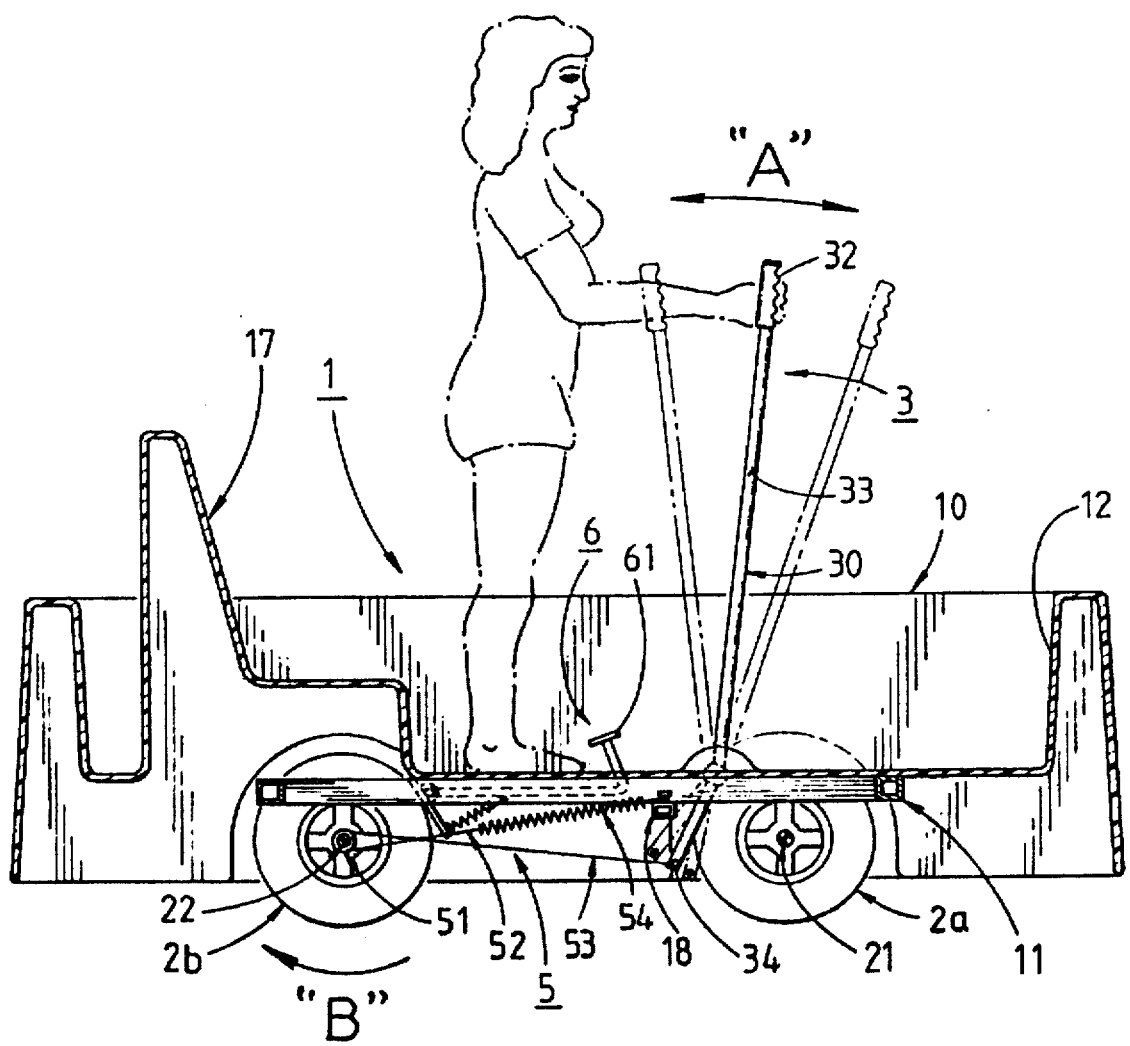
FIG. 2 is a longitudinal sectional view along the line 2—2' in FIG. 1.
Figure 3:
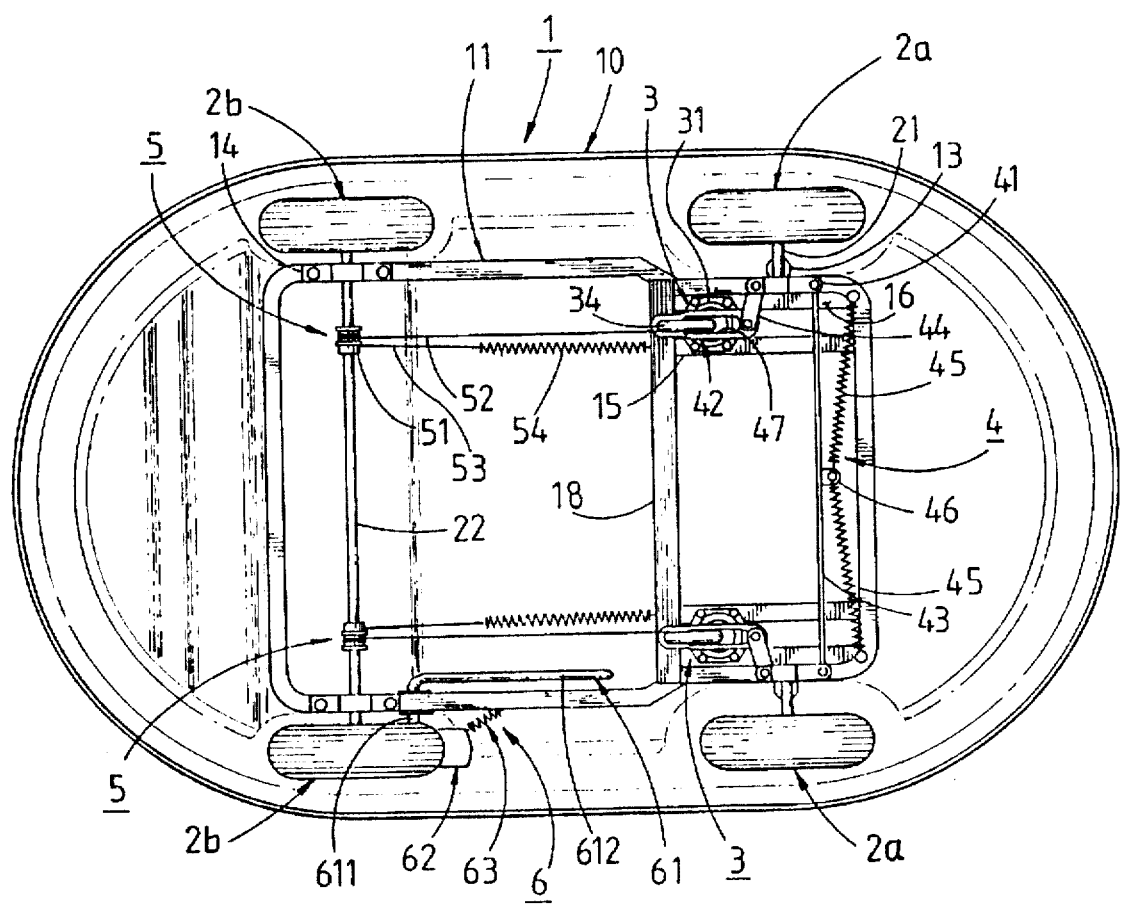
FIG. 3 is a bottom view of the present invention.

As shown in FIGS. 1, 2 and 3, the gymnastic toy car according to the present invention essentially consists of a car body, two front wheels 2a, two rear wheels 2b, two rockers 3 a four-bar linkage 4, two drive mechanisms 5 and a brake device 6.

The car body 1 comprises a housing 10 and a chassis 11 which may be made respectively and then assembled together or integrally moulded, a preferred embodiment thereof is made respectively so that the chassis 11 is made from welding L-shaped angle steel or aluminun and then assembled with the housing 10 made of plastic or glass fiber. Regardless of which manufacturing process, the top or bottom view of housing 10 is in the shape of a round life buoy, or a car, or a train or an animal as shown in FIG. 1, but the housing 10 has to be provided with a recess 12 and a chair 17 so the user can stand in the recess 12 or sit in the chair 17 in favor of operating the two rockers 3. A moulded mud shield (not shown in the drawing) has to be directly and respectively fixed on the front and rear sides of the housing 10, or a cover plate (not shown in the drawing) is fixed thereon to cover the two front wheels 2a and two rear wheels 2b so as to protect the user's safety. All the devices or members of the present invention are fixed or pivotally installed on the chassis 11.

As shown in FIG. 3, the two front wheels 2a are respectively and pivotally provided with a reverse T-shaped axle 21 to be pivotally installed on a preset vertical bearing 13 on the front two sides of chassis 11 through an upward central vertical shaft of the axle 21, and the inner end of each axle 21 is respectively assembled with two outer upright connecting rods 41 of the four-bar linkage 4 through which the two front wheels 2a are actuated to swing left or right synchronously.

As shown in FIG. 3, the two rear wheels 2b are respectively locked at the two ends of a rear axle 22 which is pivotally installed on the rear bottom side of chassis 11 through two bearings 14 with seats and two drive mechanisms 5 are installed on the rear axle 22 to drive the two rear wheels 2b actuating the present invention to move forward.

As shown in FIGS. 1 and 2 the two rockers 3 are replaceable rocker bodies 30 fixed on two fixing frames 15, 16 behind the two front wheels 2a through a ball bearing 31 with seat; the upper part 33 of each rocker 3 passes through the housing 10 and stands on the front two sides of the car body 1, the upper end of upper part 33 is provided with a grip 32 to be held by the user for shaking operation; the lower part 34 thereof is inserted in two inner upright connecting rods 42 of the four-bar linkage 4, and after passing thru the rods 42, the end of lower part 34 is connected to a pull cable 52 of the drive mechanism 5 so that manually and continuously shaking the two rockers 3 (as shown by arrowhead A in FIG. 2) can actuate the drive mechanism 5 to drive the rear axle 22 and two rear wheels 2b to turn in the direction as shown by arrowhead B in FIG. 2 to keep the present invention moving forward.

As shown in FIG. 3, the four-bar linkage 4 consists of two outer upright connecting rods 41, two inner upright connecting rods 42, a lateral long connecting rod 43, two lateral short connecting rods 44 and two pull springs 45. As mentioned above, the two outer upright connecting rods 41 are respectively assembled with the two T-shaped axles 21 of two front wheels 2a; a slot 47 is provided at the center of each inner upright connecting rod 42, the rear end of the rod 42 is pivotally installed on a cross beam 18 preset nearby the center on the lower side of chassis 11, and the slot 47 is nested on the lower part 34 of each rocker body 30. A pull spring 45 with a catch 46 is provided at the center of the lateral long connecting rod 43, the two ends of rod 43 are respectively connected to the front ends of two outer upright connecting rods 41. The two lateral short connecting rods 44 are respectively connected to the front and rear ends of two inner and outer upright connecting rods 42, 41 and the two pull springs 45 with equal tensile force are respectively installed between the catch 46 at the center of lateral long connecting rod 43 and the lower side on the two front lateral sides.

Figure 4:
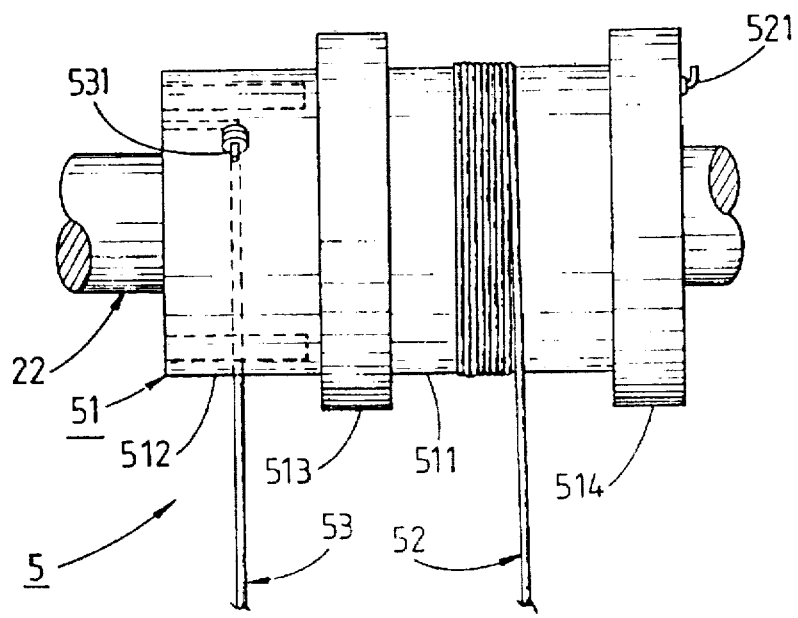
FIG. 4 is a partial enlarged top view of driving wheels of the drive mechanisms of the present invention.
Figure 5:
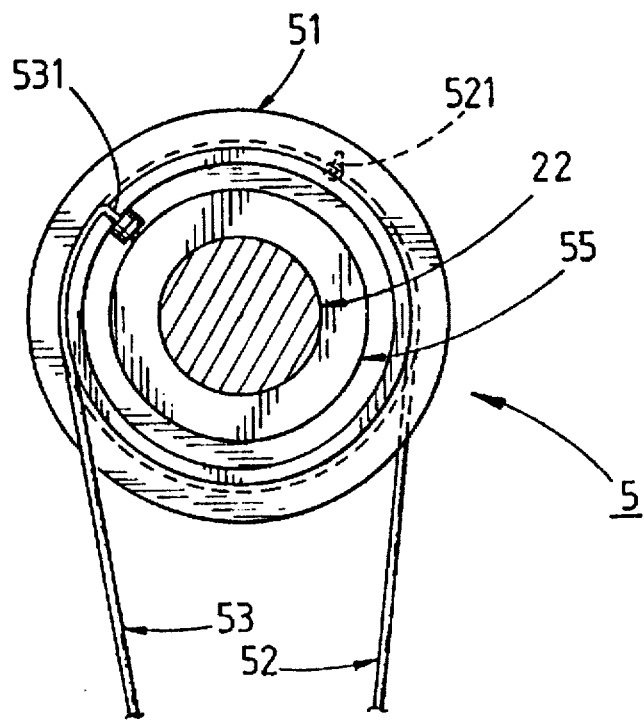
FIG. 5 is a left side view of driving wheel in FIG. 4.

As shown in FIGS. 2 and 3, the two drive mechanisms 5 consist of two drive wheels 51, two pull cables 52, two return cables 53 and two pull springs 54. As shown in FIGS. 4 and 5, each drive wheel 51 is a cable reel consisting of a primary and secondary cable reels 511, 512 respectively with a unidirectional bearing 55 (as shown in FIG. 5) and fixed on the two sides of the rear axle 22. One end of each pull cable 52 is fixed on one side of primary cable reels 511 and then wound at least five turns on the primary cable reel 511 (as shown in FIGS. 4 and 5), and another end thereof is tied on the lower part 34 of rocker body 30 (as shown in FIG. 2). One end of each return cable 53 is fixed on one side of the secondary cable reel 512 (as shown in FIGS. 4 and 5), and another end thereof is first tied to a pull spring 54 and then mounted on a cross beam 18 on the central lower side of chassis 11 through the pull spring 54 (as shown in FIGS. 2 and 3). When the present invention is moving forward through manually and continuously shaking the two rockers 3, the two primary cable reels 511 of two drive wheels 51 wind and unwind the cable 52 repeatedly, so the two sides of primary cable reel 511 may be provided with a salient ring 513, 514 respectively to prevent the pull cable 52 from sliding out from the primary cable reel 511.

Figure 6:
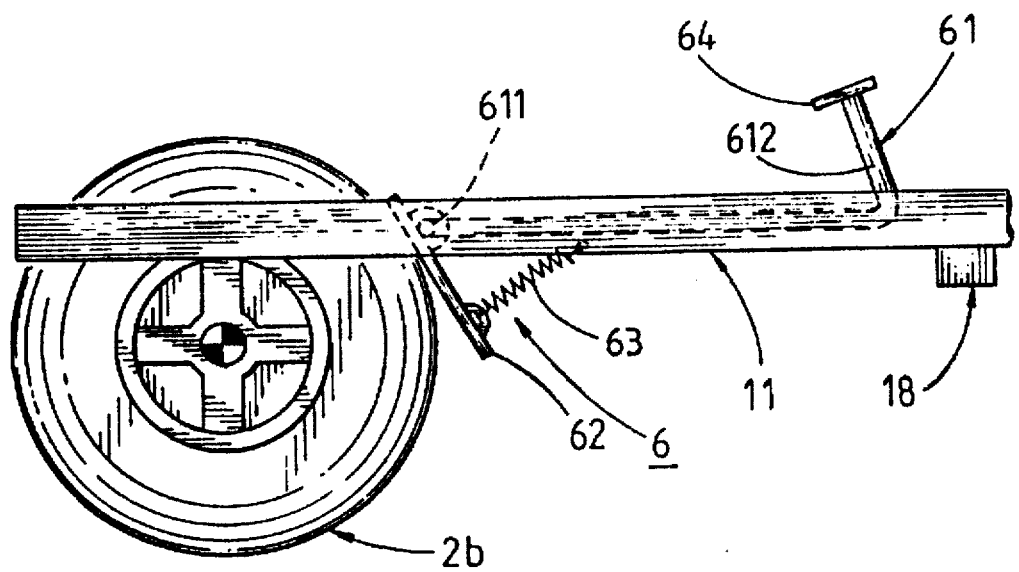
FIG. 6 is an enlarged view of brake device of the present invention.

As shown in FIGS. 2, 3 and 6, the brake device 6 of the present invention consists of a brake bar 61, a brake plate 62 and a pull spring 63. The brake bar 61 consists of a horizontal L-shaped bar 611 (as shown in FIG. 3) and a smaller L-shaped bar 612 (as shown in FIGS. 2 and 6) connected to each other, one end of the horizontal L-shaped bar 612 is pivotally mounted in a position nearby the rear wheel 2b on one side of the chassis 11, the vertical L-shaped bar 612 is extended to the upper side of housing 10, and the vertical end of bar 612 is provided with a pedal 64. The brake plate 62 is fixed at the horizontal end of horizontal L-shaped bar 611 and nearby a position of the rim tangent line of a rear wheel 2b, and a pull spring 63 is fixed between the lower end of brake plate 62 and one side of the chassis 11 (as shown in FIG. 6) for releasing the braking force of the brake plate 62.

Figure 8:
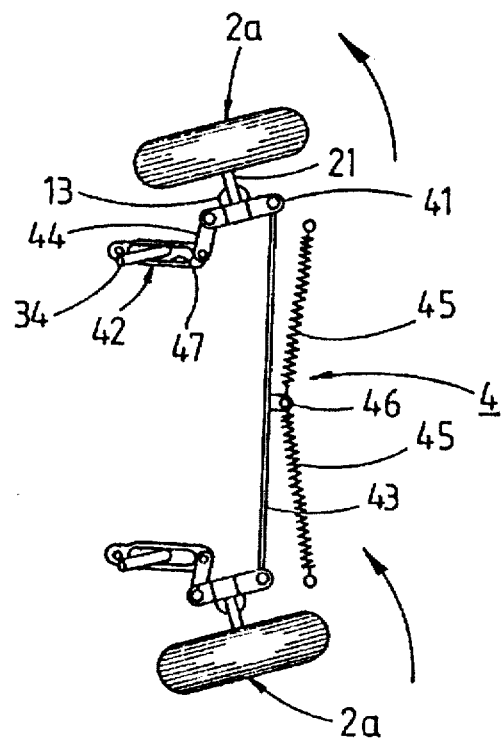
FIG. 8 is an optional view of the present invention turning right.
Figure 7:
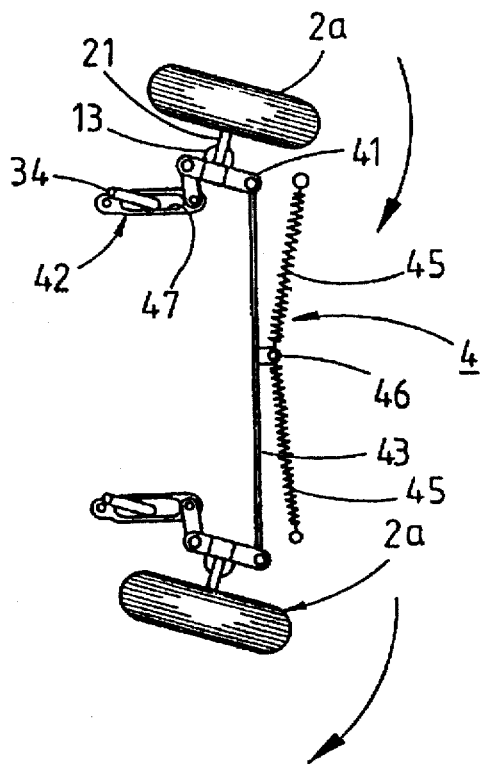
FIG. 7 is an optional view of the present invention turning left.

The operation and function of the gymnastic toy car according to the present invention are best described in detail in conjunction with the accompanying drawings as follows:

As shown in FIG. 1, when a child or adult intends to use the present invention, he may directly stand on the housing 10 of car body 1, and if the user is taller, he may half-squat in the recess 12 on the housing 10; then all he needs to do is to hold the two grips 32 of the two rockers 3 with his two hands and to continuously shake the rockers 3 simultaneously or alternately forward and rearward, the end of lower part 34 of rocker body 30 draws the pull cable 52 to further actuate the drive wheel 51 of drive mechanism 5 (as shown in FIG. 2) for unidirectionally driving the rear axle 22 together with the two rear wheels 2b to act in the direction as shown by the arrowhead B so that the present invention can move forward linearly, and the quicker the shaking, the quicker the moving. If he intends to turn left or right during moving ahead, he may simultaneously shake and tilt the two rockers 3 left or right and continuously shake these rockers 3 forward and rearward, then the present invention can move left or right on an arc line as shown by the arrowheads in FIGS. 7 and 8, and the larger the shaking angle, the smaller the turning radius, the quicker the shaking, the quicker the turning speed; and then if he shakes the two rockers 3 to be upright continuously forward and rearward, the present invention can move forward linearly. To repeatedly and alternately shake the two rockers 3 as mentioned above can quickly or slowly move the present invention forward or turn left or right and forward; and if he intends to stop it, all he needs to do is to stop shaking the two rockers 3 and to immeidately stamp the pedal 64 of brake device 6, it can stop moving ahead at once through the brake plate 62 moving to tightly press the rear wheels 2b as shown by the dotted line in FIG. 6.

I claim:

1. A gymnastic toy car comprising:
    a chassis,
        a housing mounted on the chassis, said chassis including
            two vertical bearing seats on a front two sides of the chassis,
            two fixing frames on the two front sides of the chassis,
            a cross beam at a center of the chassis,
        two front wheels, each with a reverse T-shaped axle on the two vertical bearing seats on the front two sides of the chassis,
        two rear wheels fixed at two ends of a rear axle mounted on a rear lower side of the chassis through two bearings with seats,
        two rockers, each installed on the two fixing frames of the chassis through a ball bearing with a seat, and upper ends of the two rockers extending to an upper side of the housing,
        a four-bar linkage for actuating the two front wheels to turn left and right, the four-bar linkage including
            two outer upright connecting rods pivotally connected to one end of each reverse T-shaped axle, respectively,
            two inner upright connecting rods, each with a slot at a center thereof, one end thereof pivotally installed on the cross beam of the chassis, and the slot nested on a lower end of each rocker,
            a lateral connecting rod with a catch at a center thereof and two ends thereof pivotally connected to the front ends of the two outer upright connecting rods,
            two lateral connecting rods pivotally connected to front and rear ends of the two inner and outer upright connecting rods, respectively, and
            two pull springs with equal tensile force, one end thereof fixed on the catch at the center of the lateral connecting rod and another end thereof fixed on the front two sides of the chassis, respectively,
        two drive mechanisms for driving the two rear wheels, the two drive mechanisms including
            two drive wheels having a primary and a secondary cable reel nested on a unidirectional bearing and fixed on the rear axle,
            two pull cables, one end thereof respectively fixed on one side of the primary cable reel and wound at least five turns on the primary cable reel, and another end thereof fixed at the lower ends of the two rockers, respectively,
            two return cables, one end thereof respectively fixed on one side of the two secondary cable reels, and
            two pull springs, one end thereof tied to another end of the return cable and another end thereof fixed on the cross beam at the center of the chassis, respectively, and
        a brake device for braking the two rear wheels, the brake device including
            a brake bar comprising a horizontal and a vertical lateral L-shaped bars, one end fixed in a position adjacent to one of the two rear wheels on one side of the chassis, and another end extending to an upper side of the housing,
            a pedal fixed at the other end of the brake bar,
            a brake plate fixed at the one end of the brake bar and in a position of a rim tangent line of the one rear wheel, and
            a pull spring, one end thereof fixed on the brake plate and another end thereof fixed on one side of the chassis,
    whereby shaking the two rockers forward and rearward continuously and simultaneously or alternately to actuate the two drive mechanisms to drive the two rear wheels forward, oscillating and tilting the two rockers left or right to move the two rear wheels ahead and the four-bar linkage turning the two front wheels left or right, and stopping the oscillating of the two rockers and stamping the pedal of the brake device to slow down or stop moving the two rear wheels.

2. A gymnastic toy car as claimed in claim 1, further comprising:

a recess on the housing for a user to stand therein; and a chair on a rear side of the recess for the user to sit therein.

* * * * *